United States Patent [19]
Pinter et al.

[11] Patent Number: 5,347,728
[45] Date of Patent: Sep. 20, 1994

[54] SUCTION ROLL, ESPECIALLY FOR A PAPER WEB DRIER

[75] Inventors: Reinhard Pinter, Graz, Austria; Herbert Holik, Ravensburg; Werner Leitenberger, Schiller-Wetzisreute, both of Fed. Rep. of Germany

[73] Assignee: Sulzer Escher Wyss GmbH, Ravensburg, Fed. Rep. of Germany

[21] Appl. No.: 913,170

[22] Filed: Jul. 14, 1992

[30] Foreign Application Priority Data

Jul. 15, 1991 [AT] Austria .................. 1418/91-1

[51] Int. Cl.$^5$ .................. D21F 3/10; F26B 13/30
[52] U.S. Cl. .................. 34/115; 34/117; 34/120
[58] Field of Search .................. 34/111, 113, 114, 115, 34/116, 117, 120, 122

[56] References Cited

U.S. PATENT DOCUMENTS

| | | | |
|---|---|---|---|
| 3,097,995 | 7/1963 | Beachler | 162/371 |
| 3,605,280 | 9/1971 | Fleissner | 34/115 |
| 3,946,497 | 3/1976 | Carter | 34/115 |
| 4,753,693 | 6/1988 | Street | 34/115 |
| 4,876,803 | 10/1989 | Wedel | 34/117 |
| 4,905,379 | 3/1990 | Wedel | 34/115 |
| 4,949,475 | 8/1990 | Roerig et al. | 34/115 |
| 4,980,979 | 1/1991 | Wedel | 34/115 |
| 5,015,336 | 5/1991 | Roerig et al. | 162/369 |
| 5,031,338 | 7/1991 | Wedel | 34/115 |
| 5,152,078 | 10/1992 | Wedel | 34/115 |

FOREIGN PATENT DOCUMENTS

| | | | |
|---|---|---|---|
| 0413671 | 2/1991 | European Pat. Off. | D21F 3/10 |
| 0428471 | 5/1991 | European Pat. Off. | D21F 5/04 |
| 0432571 | 6/1991 | European Pat. Off. | D21F 3/10 |
| 3907481 | 9/1990 | Fed. Rep. of Germany | D21F 5/02 |
| 3913292 | 10/1990 | Fed. Rep. of Germany | D21F 3/10 |
| WO90/01085 | 2/1990 | World Int. Prop. O. | D21F 5/04 |

*Primary Examiner*—Denise Gromada
*Attorney, Agent, or Firm*—Sandler Greenblum & Bernstein

[57] ABSTRACT

The suction roll, especially for a paper web drier, comprises a perforated roll shell containing therein an internal chamber partitioned by a wall member transversely arranged with respect to the lengthwise axis of the suction roll. A connection flow communicates the interior of the suction roll with a suction device, preferably a vacuum pump. At least one blade or vane within the suction roll at least reduces or prevents a possibly arising rotational or cyclone-like flow. Thus, the pressure differential brought about by the suction device can be completely used for creating the suction action and for fixing the paper web at the suction roll. This rotational or cyclone-like flow particularly occurs when the suction action is applied through a hollow shaft or duct.

34 Claims, 6 Drawing Sheets

SUCTION ROLL, ESPECIALLY FOR A PAPER WEB DRIER

BACKGROUND OF THE INVENTION

1. Field of the Invention

The present invention relates to a new and improved suction roll, especially for a paper web drier of a papermaking machine.

Generally speaking, the suction roll of the present development, especially for use in a paper web drier of a papermaking machine, is of the type comprising a perforated roll shell or jacket having an inner surface or wall. Within this perforated roll shell there is located an internal chamber or space divided by a wall member which is transversely arranged with respect to the lengthwise axis of the suction roll. The suction roll also has a connection or connection means flow communicating or connecting the internal chamber with a suction device, preferably a vacuum pump. At least one blade or vane which extends transversely with respect to the inner surface of the roll shell is arranged in the internal chamber.

2. Discussion of the Background and Material Information

Such type equipment is known in the papermaking art from, for example, U.S. Pat. No. 4,876,803, granted Oct. 31, 1989. The suction roll constructions disclosed therein are considered to be afflicted with the appreciable drawback that there are required large pressure differentials, and thus, also large vacuum pumps. Due to the air flows occurring internally of the suction roll there arises a pressure drop, and frequently there is no longer present an adequate pressure differential in order to retain the paper web at the suction roll.

Additional constructions of suction rolls have been taught, for example, in European Published Patent Application No. 0,413,671, published Feb. 20, 1991. In this case, a disk is arranged at the end of the suction roll at the neighborhood of the suction action which takes place through a shaft of the suction roll. This disk is fixedly connected by individual webs or struts with a cover of the suction roll, and thus, co-rotates with the suction roll. Also these suction roll constructions are only capable of reducing cyclone-type or rotary flow conditions to a limited extent.

SUMMARY OF THE INVENTION

Therefore, with the foregoing in mind, it is a primary object of the present invention to provide an improved construction of suction roll, especially for a paper web drier, which is not afflicted with the aforementioned considerable shortcomings and drawbacks.

Another and more specific object of the present invention resides in the provision of an improved construction of suction roll, especially for a paper web drier, which is able to reduce unwanted flow conditions within the interior of the suction roll, in particularly rotational or cyclone-like flow phenomena.

Still a further noteworthy object of the present invention is the provision of an improved suction roll which is quite simple in construction and design, relatively economical to manufacture, highly reliable in operation, and essentially precludes the formation of rotational or cyclone-like flow conditions within the interior of the suction roll.

Now in order to implement these and still further objects of the present invention, which will become more readily apparent as the description proceeds, the suction roll of the present development is manifested, among other things, by the features that the at least one blade or vane comprises at least one fixedly arranged blade or vane located in the internal chamber and extending at least in part transversely with respect to the inner surface of the rotatable roll shell or jacket, in order to reduce or prevent any possibly arising rotational or cyclone-like flow. Thus, the pressure differential brought about by the vacuum pump can be completely used for creating the suction action and for fixing or adhering the paper web at the suction roll. This rotational or cyclone-like flow particularly occurs when the suction action is applied through a hollow shaft or duct.

In the case of suction rolls working with a so-called cover suction action, that is, the suction or vacuum is applied through a cover or cover member of the suction roll, such rotational or cyclone-like flow is relatively weak, but nonetheless occurs. Depending upon the nature of the rotational or cyclone-like flow and the suction action, stationary or co-rotatingly mounted elements or structures have been found to be advantageous. In order to recapture some of the pressure, there can be beneficially employed blades or vanes or the like bent or curved opposite to the direction of rotation of the suction roll. Stationary or fixedly mounted blades have, in contrast to co-rotating blades, the advantage that there is incipiently prevented a rotational or cyclone-like flow. A combination of both stationary blades and co-rotating blades has been found to be especially advantageous, especially at the partition or separation surface between the individual chambers or spaces. An arrangement of co-rotating blades mounted at the inner surface or jacket of the suction roll, for example, at the central region, can reduce the occurrence of a rotational or cyclone-like flow. This is especially the case when using curved blades or vanes which are specifically directed or curved opposite to the rotational movement of the suction medium.

The stationary blades or the like are advantageously connected with a shaft member which, during operation of the suction roll, is stationary in relation to the rotating suction roll.

A further construction comprises blades connected with a disk or plate member arranged internally of the suction roll and extending essentially transversely with respect to the lengthwise axis of the suction roll. Such partition or separation disk or plate member is particularly located at the marginal or edge region of the suction roll.

If the partition or separation disk or plate member is constructed to co-rotate during operation of the suction roll, then there can be advantageously braked a rotational or cyclone-like flow prevailing, for instance, at the central region or space of the suction roll during its passage towards the marginal or edge region of the suction roll. When there is provided a partition or separation disk or plate member which is stationary during operation of the suction roll, there is incipiently realized an extensive suppression of any possibly arising rotational or cyclone-like flow.

According to an advantageous embodiment of inventive suction roll, the stationary shaft member is at least partially constructed as a hollow shaft member. It is particularly advantageous if this hollow shaft member contains openings or ports for the entry of air. These openings can be continuously opened or, according to a further embodiment, can be at least partially closed by means of a hollow cylinder member arranged within the hollow shaft member, The internally located hollow cylinder member can possess a closed end surface or an open end surface.

By virtue of these constructions there can be extremely exactly controlled the suction action and the pressure distribution at individual zones or regions of the suction roll.

If the hollow shaft member is constructed to be axially displaceable, then there are realized, especially in the case where there is closed a co-rotating disk or plate, enhanced control of the suction action.

The provision of an additional device at the circumference of the suction roll which is not contacted by the paper web increases the efficiency of the suction action at the region of the paper web. Moreover, this additional device can also serve as a guide body or element for the paper web. If such additional or supplementary device is operatively connected with a suction device, for example, a vacuum pump, then there can be effectively regulated the suction action.

According to further specific aspects of the present invention, it is contemplated that the at least one fixedly arranged blade comprises a plurality of stationary curved blades.

Still further, there also can be provided a plurality of co-rotating blades or vanes for rotating in conjunction with the suction roll. The plurality of co-rotating blades can be secured to the inner surface or wall of the perforated roll shell. These co-rotating blades or vanes also can define curved blades or vanes which are directed or curved opposite to a predetermined direction of rotation of the suction roll.

Furthermore, the suction device, namely, preferably a vacuum pump, inducts air, defining a suction medium, into the internal chamber of the suction roll, and this suction medium is rotatable in a predetermined direction of rotation. According to a further feature, the plurality of curved co-rotating blades are directed opposite to the predetermined direction of rotation of the suction medium.

Still further, there can be provided a shaft member which is stationary during operation of the suction roll. The plurality of fixedly arranged blades are fixedly mounted at this shaft member.

As previously mentioned, it is also possible for such shaft member to at least partially define a hollow shaft member which can be provided with openings for the throughpassage of air.

According to a further constructional possibility, the transversely arranged wall member which divides or partitions the internal chamber comprises a plate member having an opening, preferably a central opening for the throughpass of air and which is arranged within and connected with the rotatable perforated roll shell. The plurality of fixedly arranged blades are stationarily mounted at the plate member. Displacing or displacement means for the hollow shaft member displace such hollow shaft member into an end position where it obturates the opening of the plate member.

Furthermore, the aforementioned additional device, which is stationary, can be arranged in sealing contact with a portion of the circumference of the suction roll which is not contacted by the paper web during operation of the suction roll. In this connection, there can be further provided means for sealing the additional device in relation to the perforated roll shell, preferably at marginal or end regions of the perforated roll shell. A suction device, preferably a vacuum pump, is connected with said additional stationary device.

Still further, a cover member containing openings can be provided at the region of an end of the suction roll. There also can be provided means defining a stationary suction chamber flow communicating with the internal chamber at least through the openings of said cover member.

It is contemplated for the at least one fixedly arranged blade to extend over at least a portion of the length of the suction roll.

According to a further possible arrangement, the wall member divides the internal chamber into at least one zone having a predetermined length, and the at least one fixedly arranged blade extends substantially throughout the predetermined length of the at least one zone.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 10b illustrates in schematic fragmentary longitudinal sectional view a slightly modified embodiment of suction roll from that shown in FIG. 10a.

DETAILED DESCRIPTION OF THE PREFERRED EMBODIMENTS

Describing now the drawings, it is to be understood that only enough of the construction of the different embodiments of suction roll constructed according to the present invention have been depicted therein, in order to simplify the illustration, as needed for those skilled in the art to readily understand the underlying principles and concepts of the present invention. As mentioned previously, these suction roll constructions can be especially used in conjunction with a paper web drier or drying apparatus of a papermaking machine. Purely by way of example and not limitation it is here remarked that the inventive suction rolls can be beneficially employed with paper web drying apparatuses of the type as have been disclosed, for instance, in the commonly assigned copending United States application Ser. No. 07/10905, filed Jun. 9, 1992, to which reference may be readily had and the disclosure of which is incorporated herein in its entirety by reference.

Figure 1:
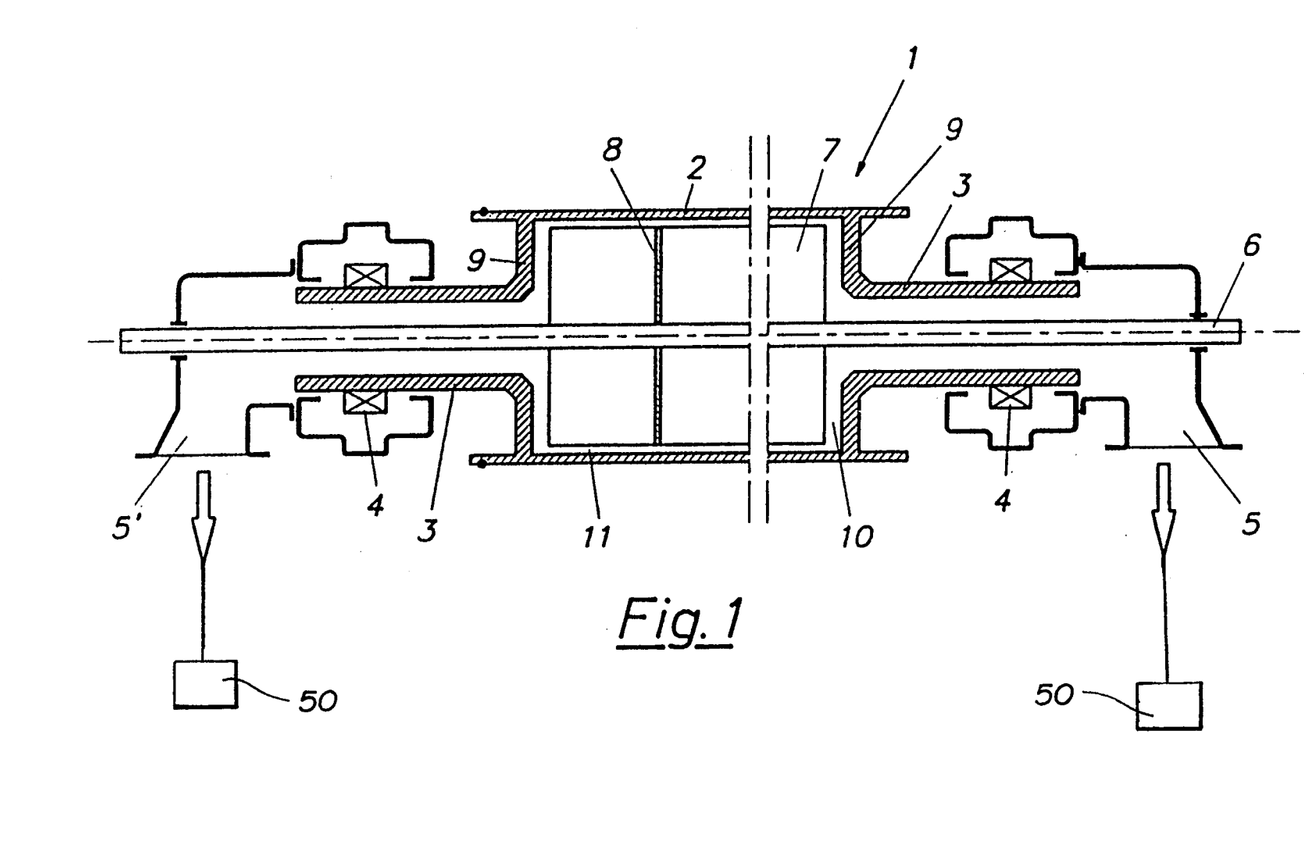
FIG. 1 illustrates in schematic longitudinal or axial sectional view a first embodiment of suction roll constructed according to the present invention.

Turning attention now to the exemplary embodiment of suction roll 1 depicted in FIG. 1, it will be seen such comprises a perforated roll shell or jacket 2 which is directly connected by oppositely situated end walls 9 with a hollow shaft member or hollow shaft members 3. These hollow shaft members 3 are rotatably journaled in bearings 4 and are operatively connected, on the one hand, with suction conduits or ducts 5 and 5' and with an internal chamber or space 10 of the suction roll 1. These suction conduits 5 and 5' are operatively connected with any suitable suction devices 50, such as vacuum pumps, in order to thus apply negative pressure to the internal chamber 10 as will be more fully explained shortly. In this internal chamber or space 10 there is located, for instance, a stationarily or fixedly arranged installation or installed unit or device 7 which is fastened with a shaft member or shaft 6. A partition or separation disk or plate 8 is provided in order to be able to separate a marginal or edge region 11 so as to achieve a more intensified or stronger suction action during start-up. This partition or separation disk or plate 8 is likewise secured to the stationary shaft member 6. Therefore, during the start-up operation, a vacuum is only applied, for instance, to the suction conduit or duct 5, defining a suction channel, which is directly connected or directly flow communicates with the related marginal or edge region 11. As a result, a more intensified suction action is achieved at this marginal or edge region 11 in relation to the remaining portion of the internal chamber 10 of the suction roll 1.

Reverting now to FIGS. 2, 3, 4 and 5, such depict different constructions of the previously mentioned stationarily or fixedly arranged installation units or devices 7.

Figure 2:
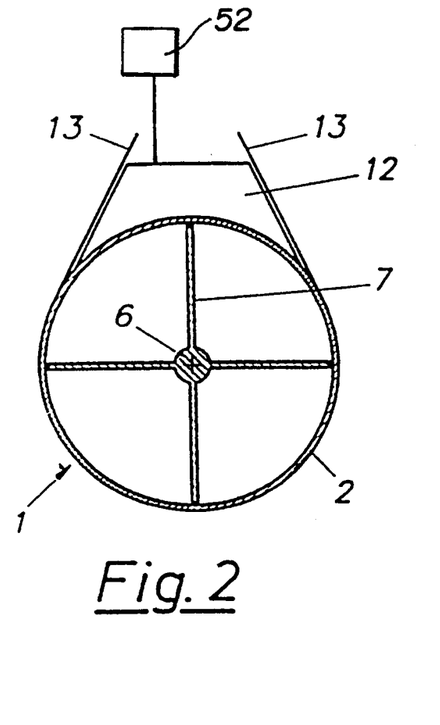
FIGS. 2, 3, 4 and 5 depict in schematic cross-section different constructions of structural installation units or devices which can be installed in the interior of a suction roll of the present development, like, for example, the suction roll of FIG. 1.

In particular, FIG. 2 illustrates a stationary installation unit or device 7 secured to the stationary shaft member 6. By means of this stationary installation unit 7 there is braked the rotational or cyclone-like flow. A stationary device 12 is arranged over that part of the circumference or periphery of the perforated roll shell or jacket 2 which is not contacted by the paper web 13. This stationary device 12 is sealed with respect to the perforated roll shell or jacket 2 and is connected with a suitable suction device 52, for instance, a vacuum pump.

Figure 3:
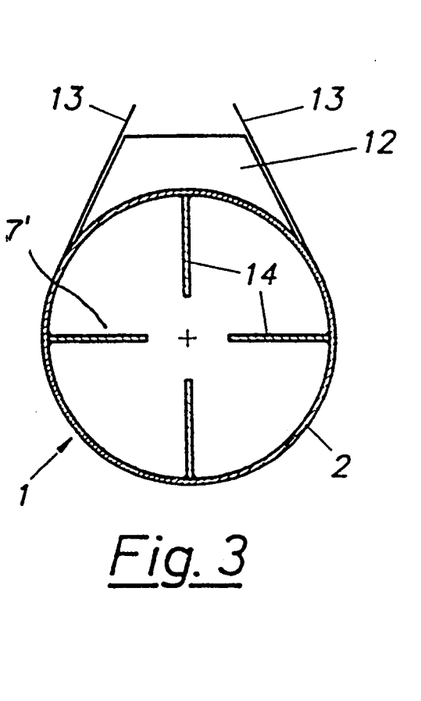

FIG. 3 depicts a variant construction of an installation unit or device 7'. This installation unit 7' comprises installation elements 14 fixedly connected with the rotatable perforated roll shell or jacket 2. By virtue of this design of the installation unit 7' there can be beneficially effectively braked the so-called potential turbulence.

Should it be desired to also reclaim part of the kinetic energy of the air flow, then such can be achieved by using blades or vanes 16 (FIG. 4) and 18 (FIG. 5) which are directed or curved opposite to the direction of rotation 17 of the suction roll 1.

Figure 4:
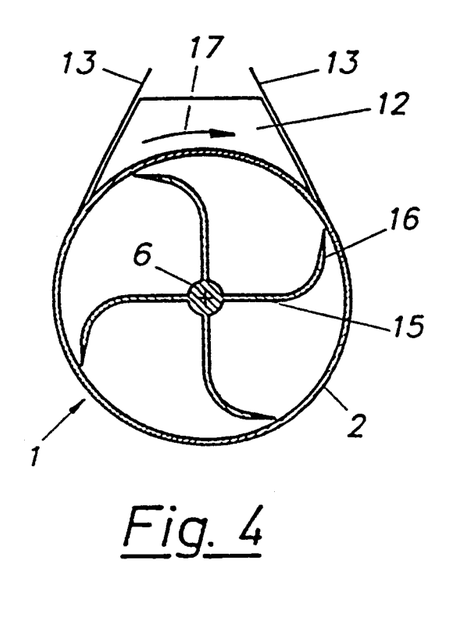

In FIG. 4 there is depicted a variant construction containing a stationary installation unit or device 15 equipped with curved blades or vanes 16 or the like. Here also, this installation unit 15 is fixedly connected with stationary shaft member 6.

Figure 5:
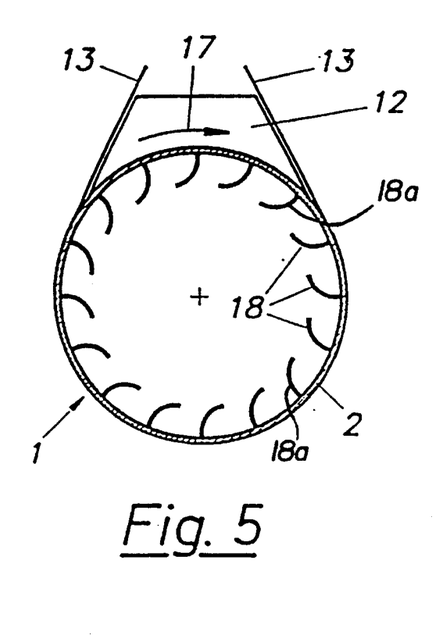

In FIG. 5 there is depicted an example of installation units or devices 18 which are fixedly connected with the rotatable perforated roll shell or jacket 2, and thus, co-rotate with the suction roll 1. In order to be able to reclaim pressure, these installation units 18 are constructed as curved or bent blades or vanes 18a which are directed or curved opposite to the direction of rotation 17 of the suction roll 1.

By way of completeness it is here remarked that the stationary devices 12 shown in each of FIGS. 3, 4 and 5 are likewise connected to a suitable suction device, like the suction device 52 shown in the arrangement of FIG. 2, but here conveniently omitted from such FIGS. 3, 4 and 5 to simplify the illustration.

Figure 6:
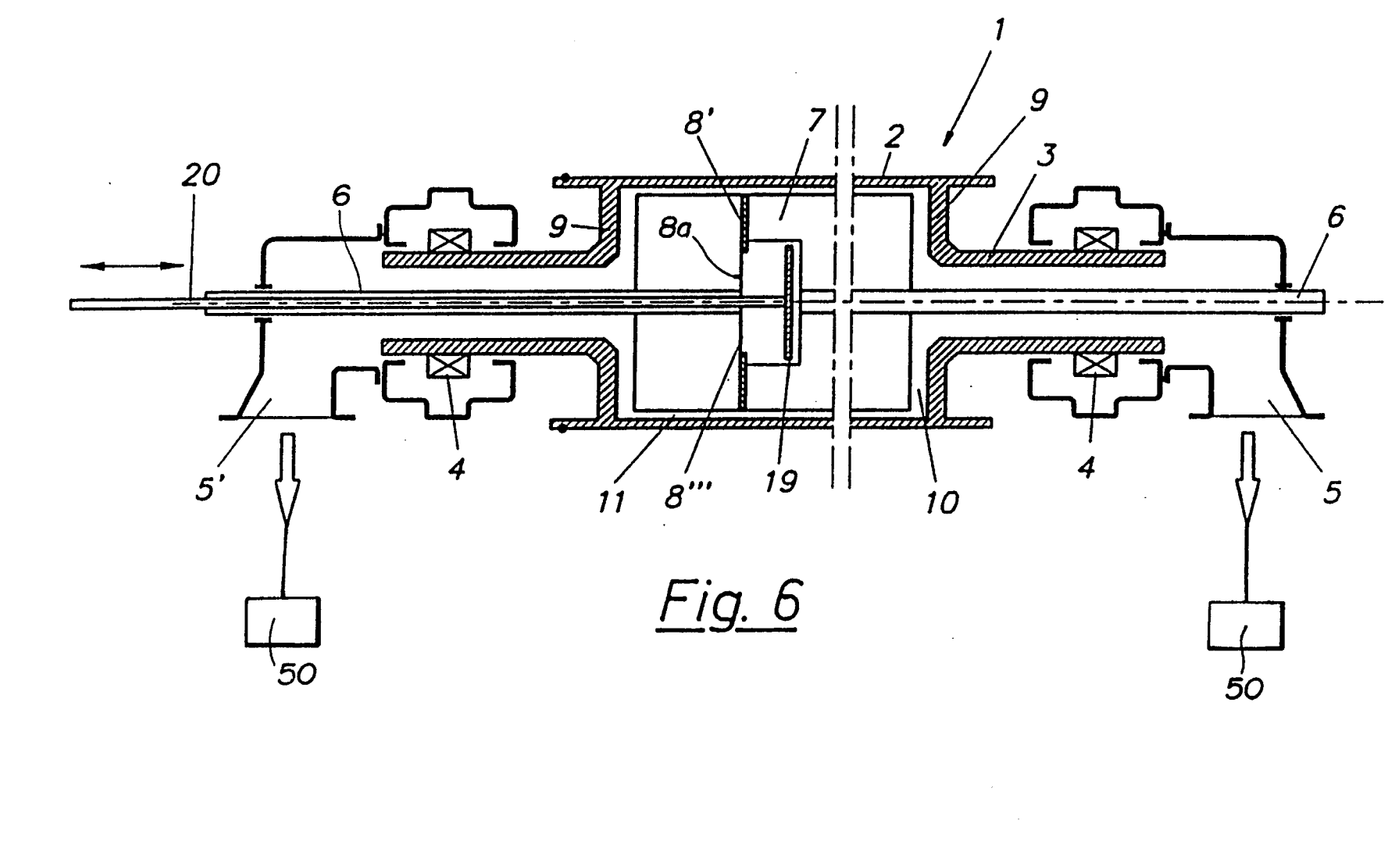
FIG. 6 illustrates in schematic longitudinal sectional view a second embodiment of suction roll constructed according to the present invention.

FIG. 6 illustrates a further variant of a suction roll 1 for separating the marginal or edge region 11 from the remaining region of the internal chamber or space 10 of the suction roll 1. In this case there is provided a plate-like disk or plate member 8' which is provided with an opening 8a at its central region. During the start-up operation when there is desired a more intensified suction action at the marginal or edge region 11 of the suction roll 1 the opening 8a of the plate-like disk 8' is sealingly closed by a displaceable plate member or plate 19 secured to a movable rod 20 which is arranged to be axially displaceable within the stationary shaft member 6. Now the suction action only takes place through the suction conduit or duct 5'.

Figure 7:
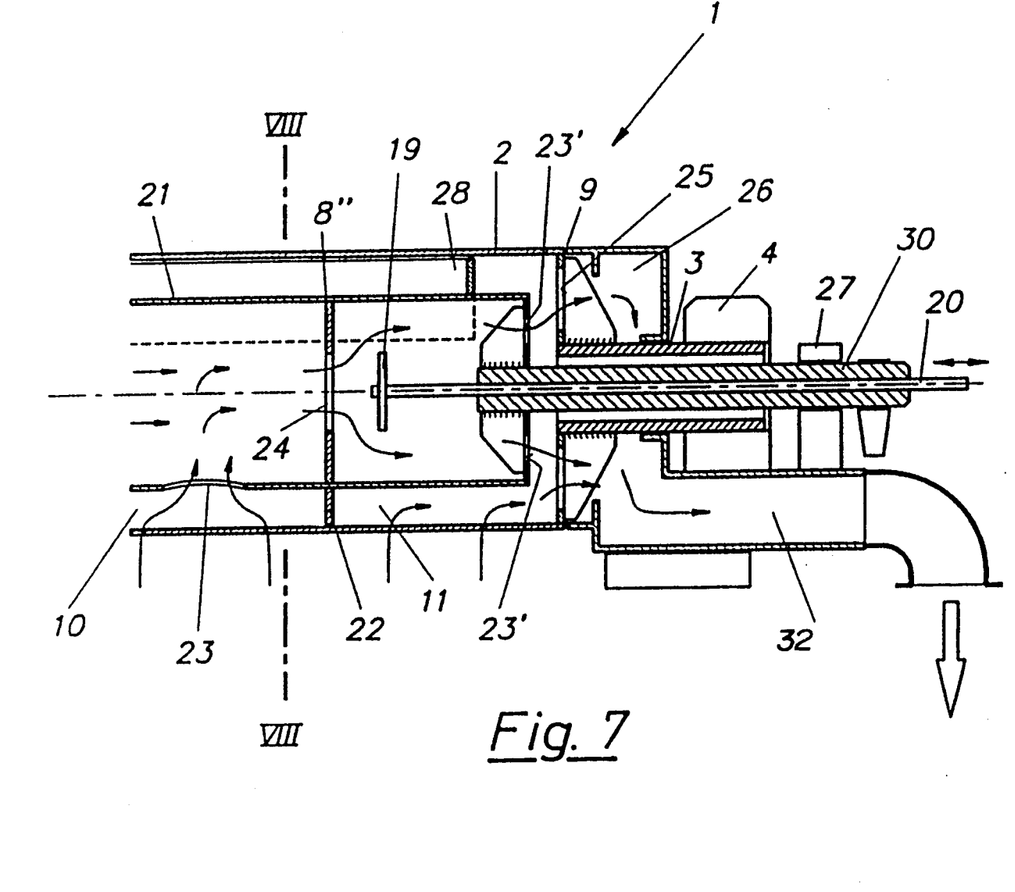
FIG. 7 illustrates in schematic fragmentary longitudinal sectional view a further embodiment of suction roll constructed according to the present invention where the suction action takes place at an end cover or cover member.
Figure 8:
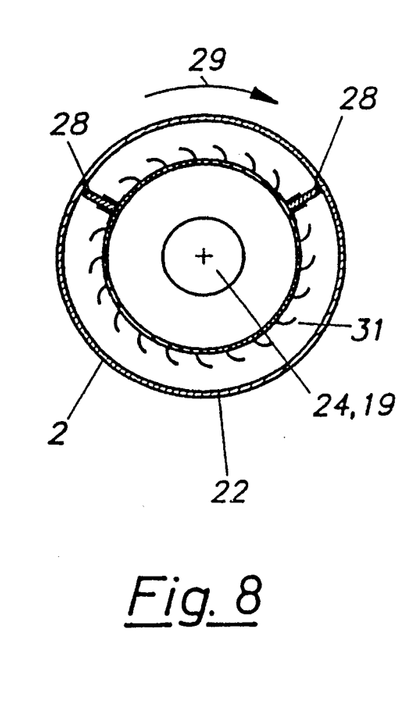
FIG. 8 is a schematic cross-sectional view of the suction roll depicted in FIG. 7, taken substantially along the section line VIII—VIII thereof.

A further construction of suction roll 1 designed according to the present invention is depicted in FIGS. 7 and 8. Here there is provided a suction roll 1 working with a so-called cover suction action, that is to say, the suction action occurs through a cover or cover member. This suction roll 1 also has a stationary inner conduit or pipe 21. The suction action exerted or induced out of the internal chamber or space 10 is here accomplished through openings or ports 23 provided in the stationary inner conduit 21 which is mounted by a shaft member 30 in a bearing 27. Such suction action is further applied through a plate-like disk or plate member 8", openings or ports 23' in the end surface or face of the stationary inner conduit 21 and via openings or ports 25 in the end wall or cover member 9 of the suction roll 1 and which lead into a stationary suction chamber or space 26 and into a suction conduit or line 32. It will be further observed that in this arrangement there are provided sealing ledges 28 or equivalent structure which bring about from internally of the suction roll 1 sealing of that portion of the circumference of the perforated roll shell or jacket 2 which is not contacted by the paper web. Finally, in the cross-sectional view of FIG. 8 there will be seen the co-rotating blades or vanes 31 bent or curved opposite to the direction of rotation 29 of the suction roll 1.

Figure 9:
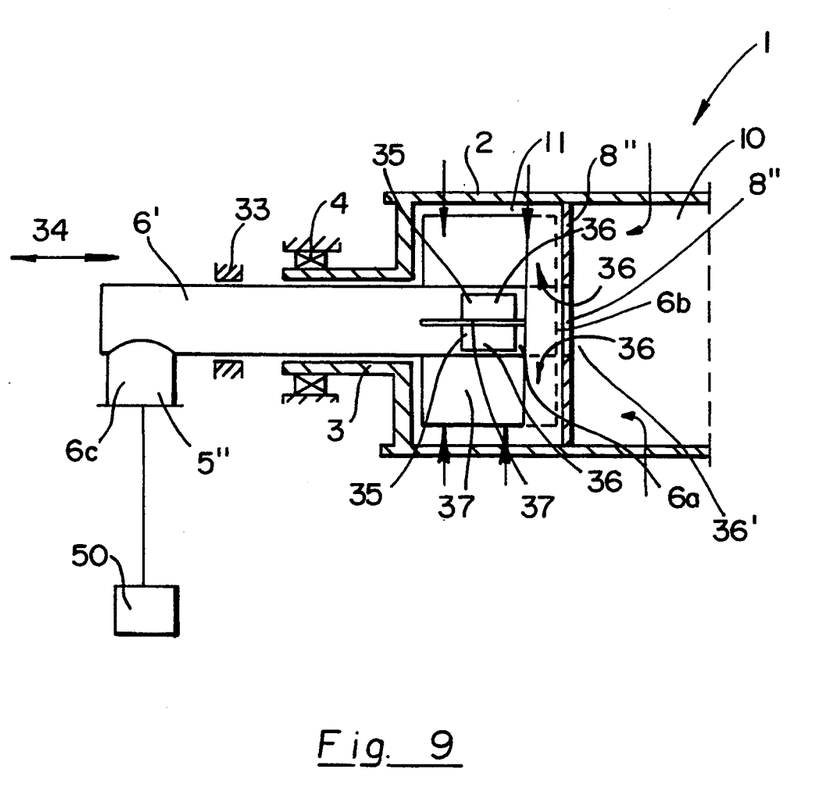
FIG. 9 illustrates in schematic fragmentary longitudinal sectional view a still further embodiment of suction roll constructed according to the present invention containing a displaceable hollow shaft member.

With respect to the still further modified construction of suction roll 1 depicted in FIG. 9 such comprises an axially movable or displaceable shaft member 6'. With this arrangement all of the air is sucked-up through openings or ports 35 provided in the displaceable hollow shaft member 6'. This displaceable hollow shaft member 6' is connected by means of a connection or stud 6c with a suction device 50, again, for instance, a vacuum pump. The air influxing through the perforated roll shell or jacket 2 is guided in the direction of the arrows 36 out of the internal chamber or space 10 of the suction roll 1 through an opening or port 8''' of the co-rotating disk or plate member $8^{IV}$ and arrives, as indicated by the arrows 36' together with the air sucked-in at the marginal or edge region 11 through the openings or ports 35 into the displaceable hollow shaft member 6'. This displaceable shaft member 6' is mounted in the bearings 33 so as to be displaceable in the direction of the double-headed arrow 34, in order that there can be set or adjusted the required suction pressure. Moreover, such displaceable shaft member 6' is provided with radially extending blades or vanes 37. The closed end 6a of the displaceable hollow shaft member 6' is brought into the dotted line position 6b in order to shutoff the marginal or edge region 11 during the start-up operation, and thus, the opening or port 8''' of the disk $8^{IV}$ is closed.

Figure 10A:
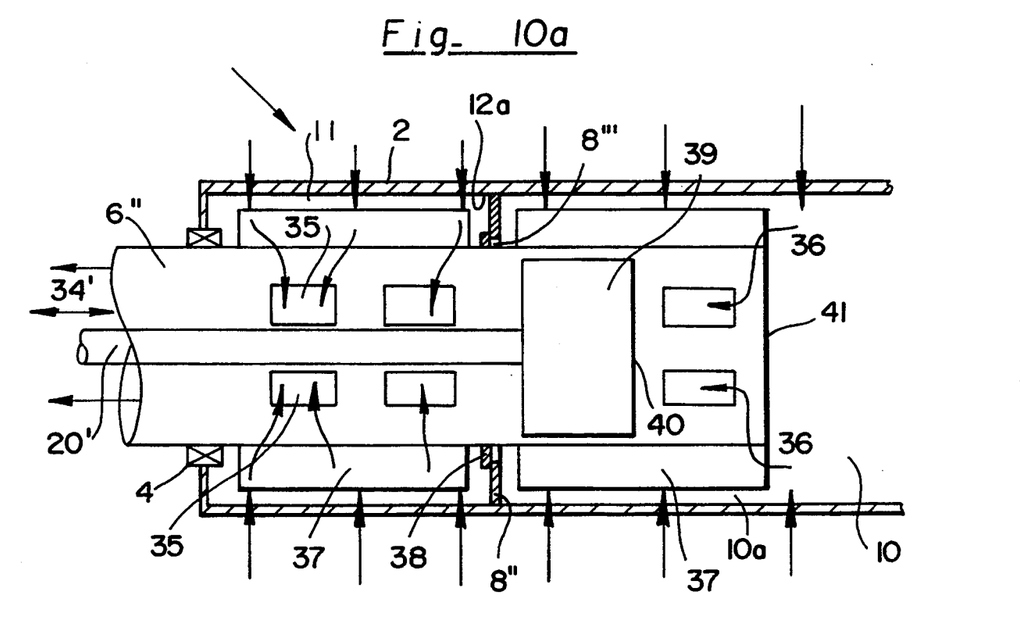
FIG. 10a illustrates in schematic fragmentary longitudinal sectional view a yet another embodiment of suction roll constructed according to the present invention containing an internally located displaceable hollow cylinder member.
Figure 10B:
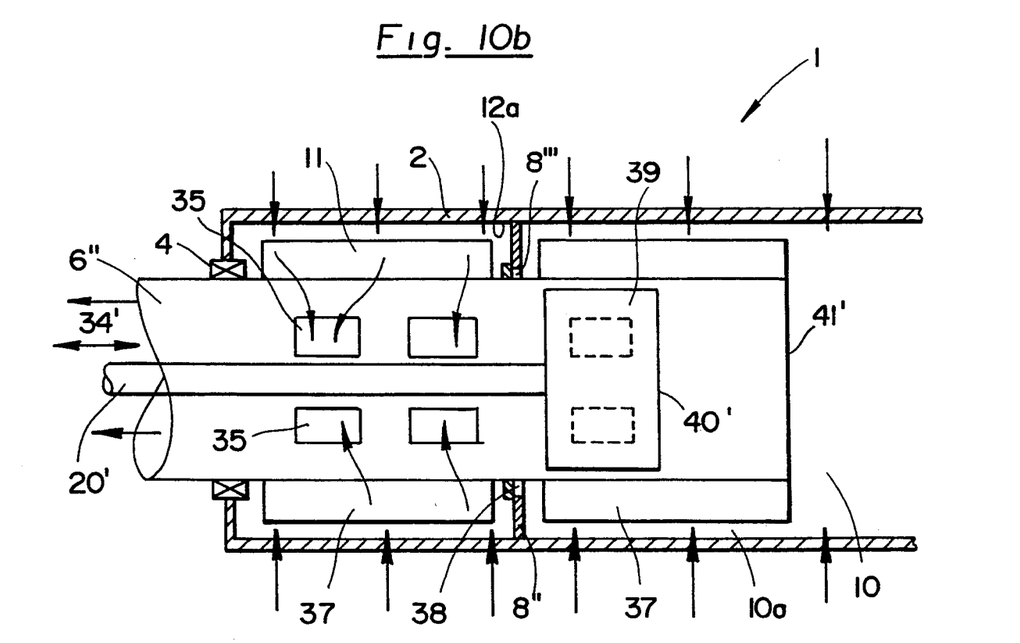

Further exemplary embodiments of the present invention are depicted in FIGS. 10a and 10b. In each case a hollow cylinder or cylinder member 39 which is displaceable in axial direction, as indicated by the double headed arrow 34' and which is equipped with a displacement rod member 20' is located within a hollow shaft member 6'' provided with openings or ports 35. This hollow cylinder member 39 can obturate the openings or ports 35 provided at the intermediate region 10a of the internal chamber 10 of the suction roll 1. The separation or closing off of this intermediate region 10a of the suction roll 1 is carried out by means of a disk or plate member $8^{IV}$ secured to the inner surface or wall 12a of the perforated shell 2 of the suction roll 1. The opening 8''' of this disk $8^{IV}$ is penetrated by the hollow shaft member 6'' and is sealed by suitable seals or sealing means 38 mounted at such hollow shaft member 6''. When the openings or ports 35 are closed at the intermediate region 10a of the suction roll 1 the entire suction output or applied vacuum of the associated suction device, like the suction device or devices 50 shown in FIG. 1, is available at the marginal region or marginal regions 11 of the suction roll 1 for the start-up operation. The stationary blades or vanes 37 can be provided either only at the marginal or edge region 11, only at the intermediate region 10a or at both regions. Moreover, there can be provided additional co-rotating blades or vanes, for example, at the inner suction roll shell or jacket 2. FIG. 10a depicts a hollow shaft member 6'' having a closed end wall 41, and the internally situated hollow cylinder or cylinder member 39 has an open end wall 41'.

In the somewhat modified construction of FIG. 10b there is depicted an arrangement having an open end wall 41' of the hollow shaft member 6'' and accordingly a closed end wall 40' of the hollow cylinder or cylinder member 39.

In both of the respective embodiments of FIGS. 10a and 10b it is possible to intentionally apply a suction action or vacuum at the marginal or edge region 11 separately from the intermediate region 10a.

In the different suction roll constructions disclosed herein, it will be understood that in those herein depicted arrangements where, as a matter of convenience in the showing of the drawings, the opposite marginal or end region has not been specifically illustrated, such opposite marginal or end region can be similarly constructed in order to provide the desired suction action at such location.

While there are shown and described present preferred embodiments of the invention, it is distinctly to be understood the invention is not limited thereto, but may be otherwise variously embodied and practiced within the scope of the following claims.

What is claimed is:

1. A suction roll having a lengthwise axis, for a paper web drier of a papermaking machine, comprising:
   a perforated roll shell having an inner surface;
   said perforated roll shell enclosing an internal chamber;
   a wall member transversely arranged with respect to the lengthwise axis of the suction roll for dividing the internal chamber;
   a suction device for establishing a vacuum in said internal chamber;
   means defining a connection for operatively connecting the internal chamber with the suction device;
   at least one blade extending transversely with respect to the inner surface of the roll shell arranged in the internal chamber; and
   said at least one blade comprising a fixedly arranged blade disposed in the internal chamber and extending transversely with respect to any possibly occurring rotational flow of suction air present in the internal chamber of the suction roll, in order to at least reduce any possibly arising rotational flow.

2. The suction roll according to claim 1, wherein:
   the suction device comprises a vacuum pump.

3. The suction roll according to claim 1, wherein:
   said at least one fixedly arranged blade comprises a plurality of stationary curved blades.

4. The suction roll according to claim 3, further including:
   a plurality of co-rotating blades for rotating in conjunction with the suction roll.

5. The suction roll according to claim 1, further including:
   a plurality of co-rotating blades for rotating in conjunction with the suction roll.

6. The suction roll according to claim 5, wherein:
   said plurality of co-rotating blades are secured to the inner surface of the perforated roll.

7. The suction roll according to claim 6, wherein:
   said plurality of co-rotating blades define curved blades.

8. The suction roll according to claim 7, wherein:
   said suction roll is rotatable in a predetermined direction of rotation; and
   said plurality of curved co-rotating blades are directed opposite to the predetermined direction of rotation of the suction roll.

9. The suction roll according to claim 7, wherein:
   said suction device inducts air, defining a suction medium, into the internal chamber of the suction roll;
   said suction medium being rotatable in a predetermined direction of rotation; and
   said plurality of curved co-rotating blades are directed opposite to the predetermined direction of rotation of the suction medium.

10. A suction roll having a lengthwise axis, for a paper web drier of a papermaking machine, comprising:
    a perforated roll shell having an inner surface;
    said perforated roll shell enclosing an internal chamber;
    a wall member transversely arranged with respect to the lengthwise axis of the suction roll for dividing the internal chamber;
    a suction device for establishing a vacuum in said internal chamber;

means for defining a connection for operatively connecting the internal chamber with the suction device;

at least one blade extending transversely with respect to the inner surface of the roll shell arranged in the internal chamber;

said at least one blade comprising a fixedly arranged blade disposed in the internal chamber and extending transversely with respect to any possibly occurring rotational flow of suction air present in the internal chamber of the suction roll, in order to at least reduce any possibly arising rotational flow;

said suction roll being rotatable in a predetermined direction of rotation;

a shaft member which is stationary during operation of the suction roll;

said at least one blade comprising a plurality of fixedly arranged blades disposed in the internal chamber; and said plurality of fixedly arranged blades being fixedly mounted at the shaft member.

11. The suction roll according to claim 10, wherein:
the shaft member at least partially defines a hollow shaft member.

12. The suction roll according to claim 11, wherein:
the hollow shaft member is provided with openings for the throughpassage of air.

13. The suction roll according to claim 12, further including:
a hollow cylinder member displaceably arranged within the hollow shaft member;
means for displacing the hollow cylinder member; and
said hollow cylinder member being displaceable by said displacing means into a position which obturates at least part of the openings of the hollow shaft member.

14. The suction roll according to claim 13, wherein:
said displaceably arranged hollow cylinder member possesses an open end surface.

15. The suction roll according to claim 13, wherein:
said displaceably arranged hollow cylinder member possesses a closed end surface.

16. The suction roll according to claim 10, wherein:
said shaft member at least partially defines a hollow shaft member; and
means for displacing the hollow shaft member.

17. The suction roll according to claim 16, wherein:
said perforated roll shell defines a rotatable perforated roll shell;
said transversely arranged wall member for dividing the internal chamber comprises a plate member arranged within and connected with the rotatable perforated roll shell;
said plate member having an opening for the throughpass of air;
said at least one blade comprising a plurality of fixedly arranged blades disposed in the internal chamber;
said plurality of fixedly arranged blades being stationarily mounted at the plate member; and
said displacing means for the hollow shaft member displacing said hollow shaft member into an end position where said hollow shaft member obturates said opening of the plate member.

18. The suction roll according to claim 17, wherein:
said opening of said plate member is arranged at a central region of the plate member.

19. The suction roll according to claim 1, further including:
an additional stationary device arranged in sealing contact with a portion of the circumference of the suction roll which is not contacted by the paper web during operation of the suction roll.

20. The suction roll according to claim 19, further including:
means for sealing said additional stationary device in relation to the perforated roll shell.

21. The suction roll according to claim 20, wherein:
said sealing means seal said additional stationary device in relation to the perforated roll shell at marginal regions of the perforated roll shell.

22. The suction roll according to claim 19, wherein:
said additional stationary device defines a guide body for the paper web.

23. The suction roll according to claim 19, further including:
a suction device connected with said additional stationary device.

24. The suction roll according to claim 23, wherein:
said suction device connected with said additional stationary device comprises a vacuum pump.

25. The suction roll according to claim 1, wherein:
said transversely arranged wall member for dividing the internal chamber comprises a plate member arranged internally of the perforated roll shell for separating a zone of the suction roll possessing an increased suction action during operation of the suction roll;
said at least one blade comprising a plurality of fixedly arranged blades disposed in the internal chamber; and
said plurality of fixedly arranged blades being stationarily mounted at the plate member.

26. The suction roll according to claim 25, wherein:
said plate member is arranged at a marginal region of the suction roll.

27. The suction roll according to claim 1, further including:
a cover member provided at an end region of the suction roll;
said cover member having openings; and
means defining a stationary suction chamber flow communicating with the internal chamber at least through said openings of said cover member.

28. The suction roll according to claim 1, wherein:
said at least one fixedly arranged blade extends over at least a portion of the length of the suction roll.

29. The suction roll according to claim 1, wherein:
said wall member divides the internal chamber into at least one zone having a predetermined length; and
said at least one fixedly arranged blade extends substantially throughout the predetermined length of the at least one zone.

30. The suction roll according to claim 1, wherein:
said wall member divides the internal chamber into at least one zone bounded at one side by the wall member; and
said at least one fixedly arranged blade is arranged in said at least one zone bounded at one side by the wall member.

31. A suction roll having a lengthwise axis for a paper web drier of a papermaking machine, said suction roll comprising;
a perforated roll shell having an inner surface;

said perforated roll shell enclosing an internal chamber defined in part by the inner surface of said perforated roll shell;

a wall member transversely arranged with respect to the lengthwise axis of the suction roll for dividing the internal chamber;

a suction device for establishing a vacuum in said internal chamber;

means for defining a connection for operatively connecting the internal chamber with the suction device; and means for opposing rotational flow adapted to be created within aid internal chamber by said suction device, said means for opposing rotational flow comprising at least one blade arranged in the internal chamber extending transversely with respect to the inner surface of the roll shell and extending in the direction of the lengthwise axis of the suction roll.

32. The suction roll according to claim 31, further comprising:

means for mounting said perforated roll shell for rotation about said lengthwise axis; and means for mounting said at least one blade stationarily with respect to said rotation of the roll shell.

33. The suction roll according to claim 32, wherein:

said means for mounting said at least one blade stationarily with respect to said rotation of the roll shell comprises a stationarily mounted shaft extending along said lengthwise axis, said at least one blade being affixed to said shaft.

34. The suction roll according to claim 31, wherein:

said at least one blade comprises a plurality of blades arranged in the internal chamber extending transversely with respect to the inner surface of the roll shell and extending in the direction of the lengthwise axis of the suction roll.

* * * * *